United States Patent [19]

Klöpper

[11] 4,007,080
[45] Feb. 8, 1977

[54] DEVICE FOR TRANSFERRING TIRE CARCASSES FROM A TIRE BUILDING-UP STATION TO A FORMING STATION

[75] Inventor: Friedrich Klöpper, Barsinghausen, Germany

[73] Assignee: Continental Gummi-Werke Aktiengesellschaft, Hannover, Germany

[22] Filed: Feb. 27, 1975

[21] Appl. No.: 553,823

[30] Foreign Application Priority Data

Feb. 28, 1974 Germany ............................ 2409586

[52] U.S. Cl. .................. 156/396; 156/126; 156/405
[51] Int. Cl.² ........................................ B29H 17/10
[58] Field of Search ............... 156/110 R, 123, 126, 156/131–133, 394 R, 396, 403, 405, 401, 415, 416

[56] References Cited

UNITED STATES PATENTS

| 2,871,912 | 2/1959 | Kraft | 156/126 |
| 3,070,478 | 12/1962 | Riddle | 156/126 |
| 3,212,951 | 10/1965 | Porter | 156/126 |
| 3,219,510 | 11/1965 | Frazier | 156/403 |
| 3,475,254 | 10/1969 | Henley | 156/123 |
| 3,721,600 | 3/1973 | Cantarutti | 156/401 |

FOREIGN PATENTS OR APPLICATIONS 1,237,300  3/1967  Germany ........................... 156/126

Primary Examiner—William A. Powell
Assistant Examiner—John E. Kittle
Attorney, Agent, or Firm—Walter Becker

[57] ABSTRACT

A device for transferring a tire carcass having a substantially cylindrical outer surface and provided with core rings, from a tire building-up station to a forming station. This transfer is effected by means of an annular holder composed of segments and provided with suction cups adapted to be placed onto the outer substantially cylindrical surface of the carcass to be transferred for supporting the carcass. The holder is variable in diameter and is supported by a carrier which is movable from the tire building-up station to the forming station. The holder has curved segmental supporting elements for supporting at least one end portion of a carcass engaged and carried by the suction cups which are selectively connectable to a vacuum creating device.

10 Claims, 2 Drawing Figures

DEVICE FOR TRANSFERRING TIRE CARCASSES FROM A TIRE BUILDING-UP STATION TO A FORMING STATION

The present invention relates to a device for transferring carcasses with core rings for raw pneumatic tires from a building-up station to a forming station by means of an annular holder which is variable in diameter, composed of segments and is adapted by means of suction cups to be placed on the substantially cylindrical outer surface of the carcass, said holder being arranged on a carrier displaceable between said building-up station and said forming station.

When producing raw tires, especially raw tires to be provided with a belt, it is known to transport the strength carriers wound upon a building-up drum and embedded in a rubber mixture, together with the mounted core rings to a forming drum separated from the building-up drum. This transfer is effected by means of a holder which through the intervention of elastic suction cups establishes the contact with the carcass. While these elastic suction cups sufficiently safely hold the carcass, they do not, due to their elasticity, sufficiently protect the carcass against undesired deformations.

It is, therefore, an object of the present invention to provide a holder which not only safely holds the carcass but will also maintain the form given to the carcass and will not permit any displacements, upsetting or pulling or tearing at the parts brought together and will also avoid undesired contacts of the carcass with parts of the drum on which the carcass is to be formed.

These and other objects and advantages of the invention will appear more clearly in the following specification in connection with the accompanying drawings, in which.

Figure 1:
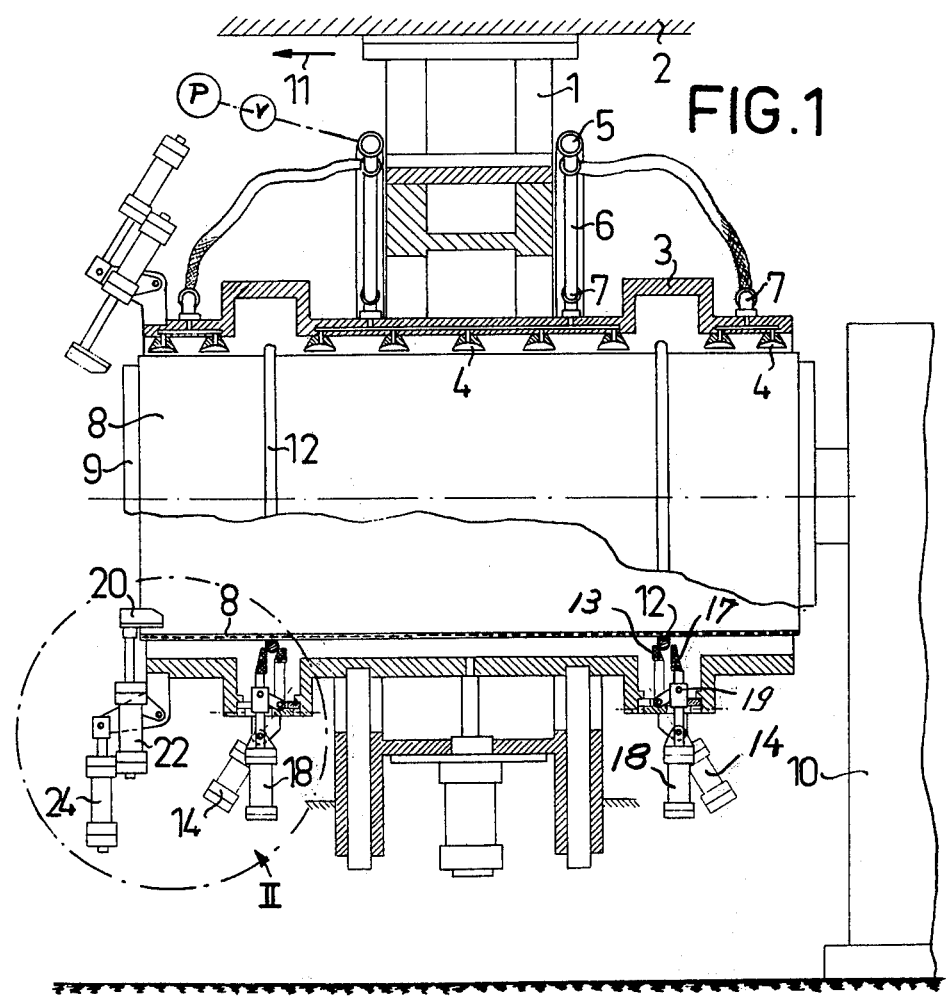
FIG. 1 illustrates a diagrammatic vertical axial section through the device according to the invention.

The device according to the present invention is characterized primarily in that the holder comprises supporting elements for the core rings as well as at least for one face end of the carcass. Expediently, the supporting elements for the core rings are designed as movable abutments limiting an axial movement and the supporting elements for the end faces are formed by hook-shaped grippers which catch behind the carcass edges and are adapted to pivot into the latter. In this way the carcass is held in an optimum rigid shape at least in three regions, namely in the region of the core rings and at least of one end face. Always that end face should be engaged which runs ahead during the transfer operation. The support of both end faces will thus be necessary in particular when very soft carcasses are involved and the danger of contact exists for both ends. The supporting elements for the core rings and for at least one end face aid each other because supporting elements for the end faces without securing the position at the core rings could possibly damage the end face edges due to a lacking axial guiding of the carcass, or inversely when exclusively employing supporting elements for the core rings could due to a possible effect upon the carcass layers aid a collapse of the end faces.

The supporting elements for the core rings are expediently designed as plier-shaped jaws which are uniformly distributed along the circumference and which each comprise an abutment jaw and a clamping jaw. Expediently, the jaws acting as holding and clamping means are each operable individually by a driving unit for instance a pneumatic cylinder piston system. The grasping by said jaws is effected in such a way that the aligned abutment jaw together with the clamping jaws are moved into operative position and then pressed together. In this way the core rings are clamped in.

The supporting elements for the end faces on the other hand are expediently designed as hook-shaped grippers with hollow cylindrical segments which when in working position represent a possibly gapless ring. The grippers are likewise advantageously by driving elements as for instance pneumatic cylinder piston systems moved pivotally and additionally displaceably. The driving elements are each formed by two working cylinder piston systems which are connected to each other on their sides and are pivotable about an axis which is tangential to the carcass. One connecting rod of said cylinder piston systems engages a fixed point while the other connecting rod of said cylinder piston systems engages the hollow cylindrical segment. When those cylinder piston systems the connecting rods of which engage the fixed points are subjected to a pressure fluid, the grippers carrying the segments are pivoted, whereas when the other cylinder piston systems are acted upon by a pressure fluid, a displacement in a substantially radial direction is effected.

Referring now to the drawings in detail, the transfer device according to the present invention comprises a carrier 1 which is horizontally displaceably mounted in a rail 2 and to which is connected a segmented hollow cylindrical holder 3 with suction cups 4 provided on the inner surface of said holder. A vacuum pump P is through a valve V, annular conduits 5, connecting conduits 6 and additional annular conduits 7 whenever desired connectible to the suction cups 4. A carcass 8 is shown within the segmented holder 3. This carcass 8 was built up on a building-up drum 9 of a frame 10 by winding upon said drum fabric or cord layers embedded in particular in rubber. During the building-up process, the holder 3 was displaced in the direction of the arrow 11 and located outside the region of the building-up drum 3. As soon as the carcass has been provided with core rings 12, the opened holder 3 is moved into the position shown in FIG. 1, and the suction cups 4 are placed on the carcass 8 and are brought into communication with the vacuum pump P.

Simultaneously or directly thereafter, abutment jaws 17 are by means of a cylinder piston system 18 pivoted about a pivot point 19, and clamping jaws 13 are by means of a cylinder piston system 14 likewise pivoted about the pivot point 19 onto the core ring 12. The pivot point 19 is by means of adjusting screws 16 adjustable in the direction of the arrow 15 or in an opposite direction.

Figure 2:
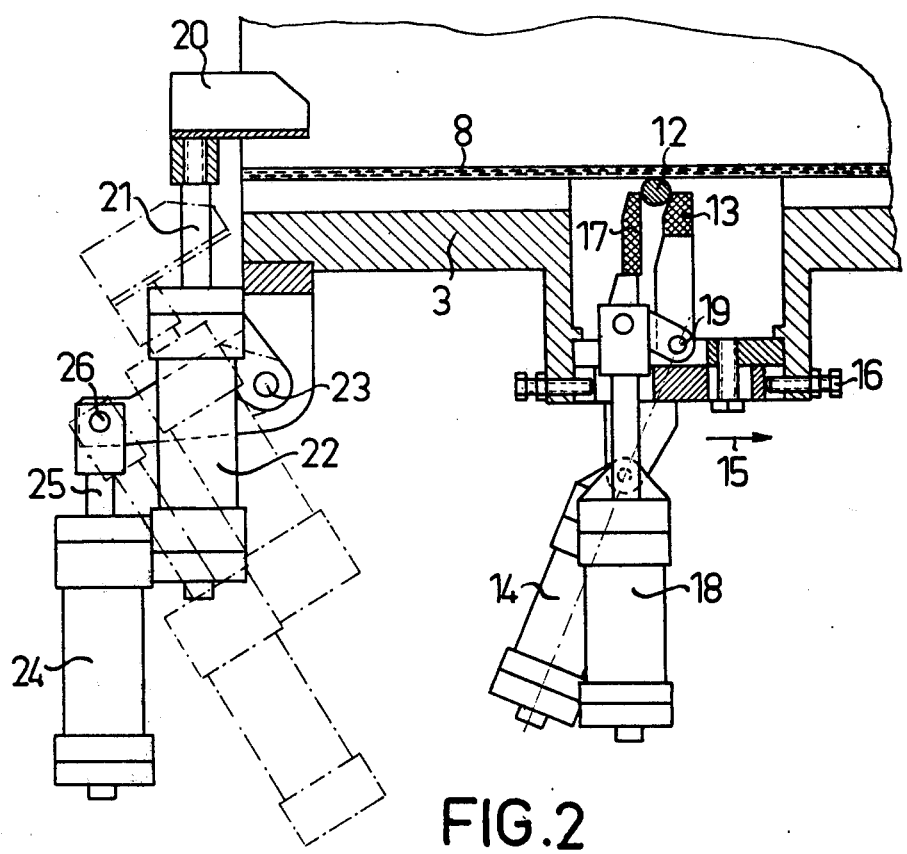
FIG. 2 shows on a larger scale than FIG. 1, that section of FIG. 1 which is located in the lower left corner of FIG. 1 and is encircled by a dot-dash circle.

As supporting elements for an end face of the carcass 8, grippers with hollow cylindrical segments 20 are employed one of which is shown in FIG. 2 on a larger scale than that of FIG. 1 while each segment 20 amounts to about one-sixth of the circumference of the hollow cylinder. The hollow cylindrical segments 20 are arranged at the free ends of the piston rods 21 of the cylinder piston systems 22 and with the piston rods 21 are moved radially outwardly or inwardly. The cylinder piston systems 22 are pivotable about an axle 23 and each one fixedly connected to a further working cylinder piston system 24, the piston rods 25 of which are rotatably connected to fixed points 26. If now one working cylinder piston system 24 is subjected to pressure fluid, it will be pivoted together with the cylinder piston system 22 associated therewith and consequently can from the position illustrated at the upper portion of FIG. 1 be moved back again into the position illustrated at the lower end of FIG. 1. FIG. 2 shows one position in solid lines and the other position in dot-dash lines.

When in conformity with FIG. 2 the hollowing cylindrical segments 20 have been moved onto the carcass 8 and when the core ring 12 is firmly grasped by the clamping and abutment jaw 13;17, the holder 3 is ready for transporting or conveying the carcass 8.

It is, of course, to be understood that the present invention is, by no means, limited to the specific showing in the drawings but also comprises any modifications within the scope of the appended claims.

What I claim is:

1. A device for transferring a tire carcass having a substantially cylindrical outer surface and provided with bead core rings from a tire building-up station to a shape forming station, the improvement in combination therewith which includes: annular holding means composed of segments and provided with suction cups adapted to be placed onto the outer substantially cylindrical surface of the carcass to be transferred for supporting said carcass, said holding means being variable in diameter and including supporting elements for the bead core rings of a carcass, carrier means carrying said holding means and operable to transfer said holding means from said tire building-up station to said shape forming station, and curved segmental supporting means supported by said holding means for supporting at least one end portion of a carcass to be carried by said suction cup equipped holding means, said supporting elements for the bead core rings being formed by plier-shaped clamping jaws distributed uniformly over periphery of said holding means as well as abutment jaws provided therewith for supporting the bead core rings.

2. A device in combination according to claim 1, in which said supporting means include hook-shaped grippers operable to catch behind the end portions of the carcass to be transported, said grippers being pivotable into and out of the end portions of said carcass.

3. A device in combination according to claim 2, which includes actuating means operatively connected to said segmental supporting means for selectively pivoting and radially displacing said segmental supporting means.

4. A device in combination according to claim 3, in which said actuating means include fluid operable cylinder piston systems.

5. A device in combination according to claim 3, in which each of said actuating means comprises two cylinders connected alongside each other and pivotable about a common axis, each of said cylinders having a connecting rod reciprocable therein, one of said connecting rods engaging a fixed point and another piston rod adjacent thereto being connected to a segmental supporting means.

6. A device in combination according to claim 5, in which said common axis extends substantially tangential to the carcass to be transferred.

7. A device in combination according to claim 3, which includes guiding means for the axial and radial displacement of said actuating means.

8. A device in combination according to claim 7, in which said holding means comprises abutment means, and in which said clamping and abutment jaws are movable between said abutment means, said abutment means being operable to limit an axial movement of said clamping and abutment jaws.

9. A device in combination according to claim 7, which includes additional actuating means operably connected to said abutment and clamping jaws for individually actuating the same.

10. A device in combination according to claim 9, in which said additional actuating means are formed by additional fluid operable cylinder piston systems.

* * * * *